Aug. 30, 1966   F. T. COX ETAL   3,269,492
GUIDE AND CENTERING MEANS FOR A BRAKE ACTUATING ROD
Filed June 6, 1963   2 Sheets-Sheet 1
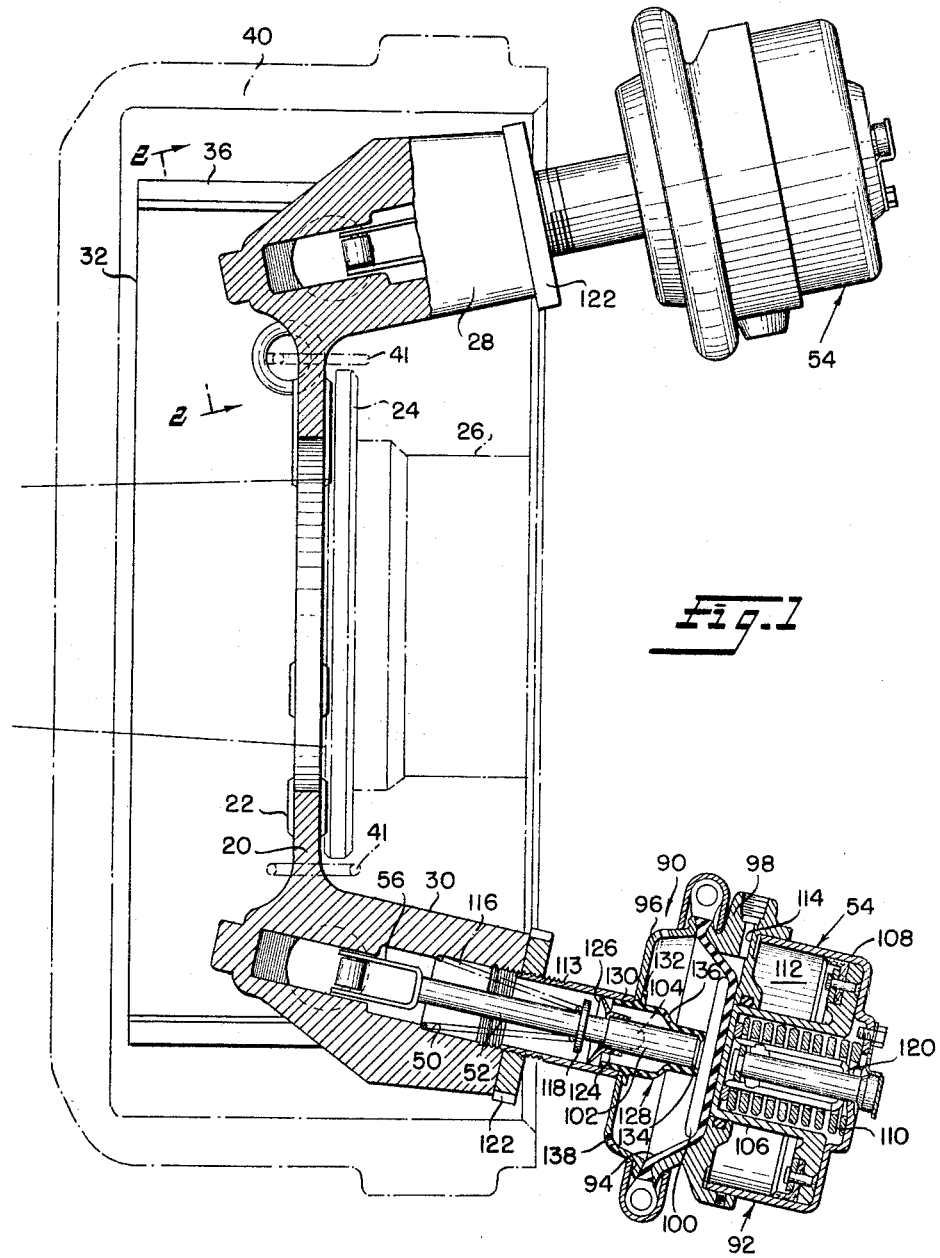
INVENTORS
Frank T. Cox
William J. Williams
BY Strauch, Nolan & Neale
ATTORNEYS Aug. 30, 1966  F. T. COX ETAL  3,269,492
GUIDE AND CENTERING MEANS FOR A BRAKE ACTUATING ROD
Filed June 6, 1963  2 Sheets-Sheet 2
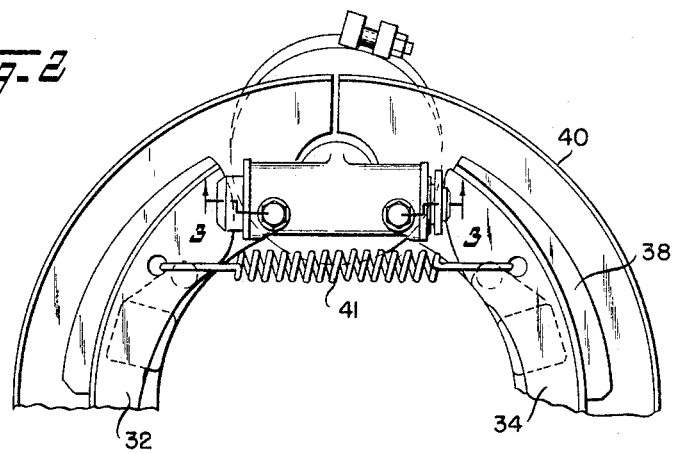
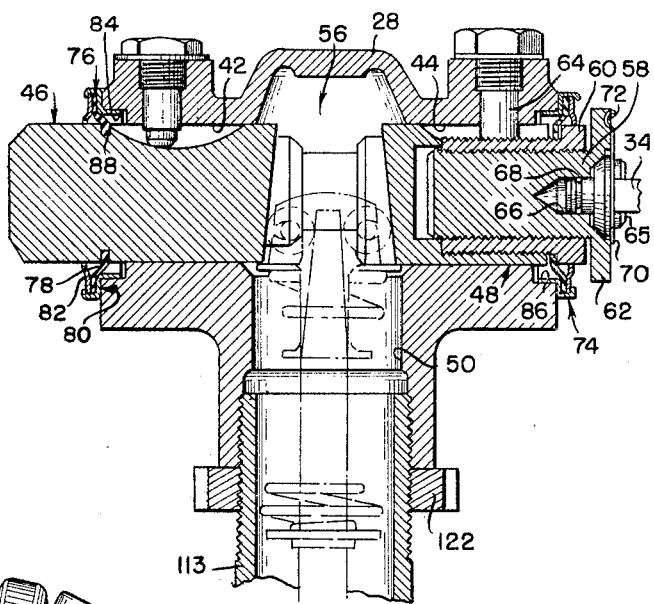
INVENTORS
Frank T. Cox
William J. Williams
BY Strauch, Nolan & Neale
ATTORNEYS United States Patent Office 3,269,492
Patented August 30, 1966

3,269,492
GUIDE AND CENTERING MEANS FOR A BRAKE ACTUATING ROD
Frank T. Cox and William J. Williams, Ashtabula, Ohio, assignors, by mesne assignments, to Rockwell-Standard Corporation, a corporation of Delaware
Filed June 6, 1963, Ser. No. 286,038
2 Claims. (Cl. 188—152)

The present invention relates to brake systems and more particularly to such systems for trucks and heavy duty installations.

It has long been desired in the automotive field, particularly in the truck field, to provide brake systems which are trouble free and which do not require lubrication nor adjustment throughout the life of the brake linings.

Because of the rigorous service requirements of truck brakes it has not heretofore been possible to achieve trouble free, maintenance free operation to the extent that this objective has been achieved in brakes for passenger vehicles. For example, many systems for automatically adjusting the brakes of passenger vehicles are too delicate for heavy duty use. Also, prior lubrication systems are, in general, not sufficiently effective to satisfy the requirements for heavy duty use.

With these considerations in mind it is the principal purpose and object of the present invention to provide improved truck brake systems which eliminate the need for lubrication, adjustment and other forms of maintenance for the full life of the brake lining.

It is a further object of the present invention to provide improved brake systems which have the above stated advantages without increasing the cost or complexity of the systems.

In obtaining these and other objects the present invention provides brake systems of the general type disclosed in Patent 3,037,584, owned by applicant's assignee. In this type of heavy duty brake system the brake actuating mechanism is supported on a spider which may be bolted or welded to the usual axle housing flange and extending generally radially within the brake drum. The spider supports both the wedge actuated brake mechanism and the pneumatic or hydraulic operator for the wedge type mechanism.

In this type of system the wedge actuated brake mechanism and the power operator both require lubrication and protection from dirt and other foreign matter. As the brakes are applied or released the volume enclosed by the wedge mechanism and the power operator varies appreciably. In the past, it has not been possible to provide effective long lasting seals for this space for this reason. Consequently, it has been necessary to replace lubricant frequently and to clean the mechanism from time to time.

It is accordingly a more specific object of the present invention to provide improved sealing systems for such brake mechanism which guard against the loss of lubricant and prevent the entry of dirt with increased effectiveness and which have increased resistance to blow out occasioned by pressure changes in the system and increased resistance to damage by heat generated in the brake mechanism.

It is a more specific object of the present invention to provide improved brake mechanisms of the general type shown in Patent 3,037,584 which offer increased reliability, reduced maintenance requirements and which also provide for automatic application of the brakes in the event of failure of the normal hydraulic or pneumatic operating system.

Additional objects and advantages will become apparent as the description proceeds in connection with the accompanying drawings in which:

FIGURE 1 is a side view partly in section and partly in elevation illustrating a brake system incorporating the present invention;

FIGURE 2 is a half plan view in the direction of arrows 2—2 illustrating the connection of an actuating mechanism to the brake shoes;

FIGURE 3 is an enlarged section of the portion of the actuator mechanism connected to the brake shoes; and FIGURE 4 is a fragmentary view partly in section showing a modification of the invention.

Referring now more particularly to the drawings and especially to the embodiment of FIGURES 1, 2 and 3, the brake mechanism of the present invention is supported on a spider 20 secured for example by rivets 22 to the usual flange 24 formed integrally with the axle housing 26. As explained in detail below all of the brake actuating mechanisms are supported on housings 28 and 30 formed integrally with the spider 20. The brake includes a pair of shoes 32 and 34 suitably mounted on the spider 20 and provided with the usual linings 36 and 38 for selective engagement with the interior of the brake drum 40. The brake shoes are held in retracted position by upper and lower springs 41 and are preferably mounted in the manner shown in the aforesaid U.S. Patent 3.037,584.

As best shown in FIGURE 3, the housing 28, which is identical to the housing 30, is provided with aligned cylindrical bores 42 and 44 which slidably support brake actuating plunger assemblies 46 and 48, respectively, and a side opening 50 through which a brake actuating plunger 52 extends.

The inner end of the plunger 52, which is reciprocated by the actuator mechanisms 54 described in detail below, is connected to a wedge roller mechanism, indicated generally at 56, which engages the inner ends of the plunger assemblies 46 and 48.

The plunger assembly 48 contains a mechanism for initially adjusting the brakes and for automatically adjusting the brakes in operation. This mechanism comprises inner and outer nuts 58 and 60 which, when relatively rotated, change the effective length of the plunger assembly. For the initial adjustment the inner nut member 58 is rotated by means of a star wheel 62 and for automatic adjustment a ratchet mechanism 64 is provided which operates in the manner explained in detail in U.S. Patent 3,068,964, owned by applicant's assingee. A retainer 65, which engages the brake shoes 34 is frictionally held in a bore 66 in the inner nut member 58 by an O-ring 68 and is releasably locked against rotation with respect to the nut member 58 by a spring lock member 70 having a detent portion 72 receivable in one of a series of peripheral indentations in the star wheel 62.

The seals provided at the outer ends of the plunger in prior constructions have been subject to rapid deterioration or have in some cases been blown out. Because of their location the seals are particularly susceptible to damage, both because of overheating and because they are subjected to pneumatic pressure variation due to the change of the column enclosed within the actuator system as the brake is actuated and released. Actual experience has shown that the sealing structures indicated generally at 74 and 76 effectively solve these problems.

These sealing structures are of three piece construction and include an annular sealing ring 78 of rubber, the outer periphery of which is clamped between an annular metal retainer 80 and a cone shaped metallic washer 82. The sealing structure is securely retained in place by an essentially cylindrical body portion 84 of the retainer 80, which is press-fitted into a counterbore 86 provided at the outer end of the cylindrical bore 44. The outer margin of the retainer 80 is crimped around the washer 82 to firmly clamp the outer margin of the rubber seal ring 78 between the parts. The inner periphery of the rubber ring 78 is stretched around the outer periphery of tthe outer nut 60 in a groove formed between the outer end of the plunger 48 and a shoulder in the outer end of the nut member 60.

The seal is shown in FIGURE 3 in the fully retracted position of the plunger mechanism 48. It will be noted that in this position there is sufficient room to permit blousing of the rubber ring. Similarly in its fully extended position the cone shaped washer 82 permits reverse blousing of the rubber ring. The inner periphery of the conical washer 82 fits closely around the outer periphery of the nut 60 so as to prevent the entry of dirt and to wipe the outer surface of the nut in each actuation of the brake. The washer also shields the rubber ring 78 against the extreme heat occasionally developed at the brake drum.

Actual tests have shown that the sealing structure provides unusual resistance to blowout and, under all circumstances, provides a tight seal, preventing the escape of lubricant and the entry of foreign matter.

The opposite seal 76 is identical to the seal 74 except that the inner periphery of the rubber ring 78 is tightly clamped in an annular groove 88 provided in the plunger assembly 46.

The air brake actuators 54, which are of identical construction, each comprise a service chamber section 90 and a spring actuated emergency section 92 which are of essentially unitary construction. Except as noted below the actuators 54 are of the same construction as that disclosed and claimed in application Serial No. 52,711 filed by applicant's assignee on August 29, 1960, for Brake Operating Mechanisms, now U.S. Patent 3,136,227. Accordingly, they will be disclosed here only to the extent necessary to an understanding of the present invention.

The service chamber section 90 of the brake includes a flexible diaphragm 94 peripherally clamped between housing sections 96 and 98 and having a central portion abutting a circular pad 100 formed integrally with or otherwise secured to the end of the pushrod 102, the end of which is recessed as at 104 to receive the rounded outer end of the plunger 52. The diaphragm 94 is normally urged to the position shown in FIGURE 1 by the action of the brake springs in which position the central portion of the diaphragm rests against the inner end of an emergency piston 106 slidably received in a cylindrical cup 108 threaded into or otherwise secured to the housing section 98. A strong spring 110 is normally compressed between the end of the housing member 108 and the inner surface of the piston 106. The piston 106 is normally held in its fully retracted position by system pressure supplied through an inlet, not shown, to the space 112 at the forward side of the piston. The brake is normally applied by applying system pressure through an inlet 114. This moves the diaphragm 94 and the plungers 102 and 52 to the left, urging the wedge mechanism 56 between the plungers 46 and 48 to spread the latter apart to apply the brakes. In normal operation the emergency piston 106 remains in its fully retracted position.

When the brakes are released the springs 41 return the brake shoes to their inactive position and return the other components to the position shown in FIGURE 1. This action is aided by a spring 116 compressed between a portion of the housing 30 and a washer 118 carried by the pushrod 52.

Should the normal system pressure fall below a predetermined level for any reason, the spring 110 will advance the piston 106 to effect automatic application of the brakes.

The mechanism is installed with the plungers 46 and 48 in engagement with the respective brake shoes and closely adjacent their inner limit of travel. The plunger 52 is moved to a position to insure positive but light engagement between the wedge roller mechanism 56 and the inner ends of the plungers 46 and 48. Then the actuator mechanism 54 is installed by threading the tubular portion 113 into the threaded opening 50 provided in the housing 28 or 30. The components are adjusted properly when the previously described relationship of the wedge mechanism 56 and the plungers 46 and 48 is maintained and the outer end of the plunger 52 is firmly seated in the plunger 102 and the diaphragm 94 is in the retracted position as shown in FIGURE 1. During installation the piston 106 is held in retracted position by a retainer mechanism 120 described in detail in U.S. Patent 3,136,227.

The actuator 54 is then firmly locked in this position by a lock nut 122 threaded on the outer surface of the tubular portion 113 and tightly engaging the outer end of the housing 28 or 30. This adjustment of the system provides a convenient, quick means for assembling the brakes to assure their efficient subsequent operation without the need for manufacturing the brakes to particularly close tolerances and also permits a convenient way of aligning the hydraulic connections.

Assembly of the components is facilitated by a unique guide carried by the end of the stub shaft 102. This guide, which may be formed of a suitable plastic has a cylindrical portion 124 press fitted onto the end of the plunger 102 and a conical portion 126, the outer diameter which is slightly less than the inner diameter of the tubular housing portion 113. In the absence of this guide it has been difficult to seat the end of plunger 52 in the recess in plunger 102 because of the tendency of the latter to leave its central position. Assembly of these parts has been particularly difficult since they are completely hidden from view by the tubular housing portion 113. However, the guide maintains the plunger 102 centered within the tubular housing member 113 at all times. As the ends of the plungers 52 and 102 are brought together the conical portion of the guide picks up the end of the plunger 52 and guides it smoothly into the recess provided in the inner end of the plunger 102. The guide may take other forms. For example, it may be in the form of a metal split ring frictionally held on the end of the plunger 102.

It will be noted that the brake actuating diaphragm 94 together with the seals 74 and 76 at the outer end of the wedge actuated plungers define a space, the volume of which varies substantially as the brake is actuated and released. In prior constructions this change in volume has caused the seals on the plungers to blowout or rupture. The mere incorporation of a breather in the member 96 does not fully solve the problem because of the volume of air which the breather is required to accommodate since there is always the possibility that moisture or dirt may be drawn in through the breather when the brake is released and eventually passed into the wedge actuating mechanism. In accordance with the present invention this problem is overcome not only by the provision of seals 74 and 76 which are stronger and better protected but also by the provision of a novel boot type seal structure 128 in the actuator 54.

One end of the seal 128, which is preferably fabricated from rubber, extends into and is cemented as at 130 to the outer end of the tubular portion 113 of the actuator. To assure a firm bond in this region a radial flange 132 is also cemented to the inner surface of the chamber member 96. At its opposite end the seal 128 is of reduced section so as to fit closely around the stub shaft 102, the outer end of the seal being provided with an annular bead 134 tightly received in a retaining groove in the stub shaft 102.

In its relatively enlarged portion the seal is provided with a breather hole 136. In a typical case where the overall length of the boot seal is two inches and its largest diameter is approximately two inches the breather hole 136 will be .06 inch in diameter. A plurality of slightly larger breather holes 138 are provided in the chamber member 96.

By virtue of this unique construction the volumetric change to which the seals 74 and 76 are exposed is greatly reduced. The change in volume is easily accommodated by the very small breather hole 136. The major change in volume is accommodated by the breather holes 138. While some dirt and moisture may enter these holes it cannot pass to the wedge end components because of the tight seal effected by the flexible member 128 which is interrupted only by the very small hole 136. The possibility of the entry of the moisture and dirt through the hole 136 is further minimized by the reduced breathing requirement because of the reduced change in volume in the space enclosed by the seal.

The embodiment of FIGURE 4 is, in all respects, identical to the previously described embodiment except for the elimination of the emergency brake actuator. Accordingly, instead of the housing section 98 a cover plate 140 is provided having a central opening 142 for connection to the brake system pressure line.

From the foregoing it will be apparent that the above stated objects and advantages of the invention have been attained by the provision of novel brake systems, the components of which cooperate to facilitate initial assembly and adjustment and which effectively maintain the adjustment during the life of a brake lining to assure the continued complete effectiveness of the emergency actuator.

The seals also cooperate to insure retention of lubricant in the area in which lubricant is required and insure the exclusion of dirt and moisture from the operating components of the mechanism. The arrangement of the seals themselves at the wedge mechanism and the power actuator mechanism are effective to reduce both the likelihood of damage to the seals and the possibility of entry of foreign matter into the sealed components of the mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A brake assembly comprising a pair of brake shoes adapted to engage a surrounding brake drum, an actuator assembly in an actuator housing for selectively urging said shoes toward said drum, a fixed elongated tubular member detachably secured at one end to said actuator housing, a service chamber housing carrier by the opposite end of said elongated tubular member, the diameter of said service chamber being substantially greater than the diameter of said elongated tubular member, a flexible diaphragm peripherally clamped in said housing to define with said housing a pair of chambers, the chamber at the side of said diaphragm remote from said tubular member being connectable to a source of actuating air under pressure, means venting the other chamber, an actuator rod operatively connected to said actuator assembly and extending therefrom into said tubular member, a pushrod operatively connected to the central portion of said diaphragm and extending into said tubular member and having a recess for the reception of the end of said actuator rod, there being a substantial clearance between said actuator rod and said pushrod and the surrounding tubular member, and a guide carried by said pushrod and slidably engageable with the interior of said tubular member to maintain said pushrod centered therein, said guide also having a portion guiding the end of said actuator rod into the recess in the end of said pushrod during assembly.

2. The brake assembly according to claim 1 wherein said guide comprises a member having a tubular body portion fitted over the end of said pushrod and a conical skirt portion integral with said body portion in close clearance relation with said tubular member.

References Cited by the Examiner
UNITED STATES PATENTS

| | | | |
|---|---|---|---|
| 957,347 | 5/1910 | Kennedy | 74—18.2 |
| 1,537,549 | 5/1925 | Raffay | 29—271 |
| 2,162,775 | 6/1939 | Dick | 188—152 |
| 2,181,203 | 11/1939 | Reynolds | 277—189 |
| 2,418,848 | 4/1947 | Perrot | 188—78 |
| 2,553,343 | 5/1951 | Van Der Wilt | 188—79.5 |
| 2,720,475 | 10/1955 | Geiger | 29—234 X |
| 2,757,640 | 8/1956 | White | 188—152 |
| 2,854,954 | 10/1958 | Howze. | |
| 2,861,456 | 11/1958 | Soderberg | 74—18.2 |
| 3,037,584 | 6/1962 | Cox et al. | 188—78 |
| 3,068,964 | 12/1962 | Williams et al. | 188—79.5 |
| 3,110,502 | 11/1963 | Pagano | 277—189 |
| 3,136,227 | 6/1964 | Williams | 92—63 |
| 3,152,521 | 10/1964 | Cruse | 92—63 |

FOREIGN PATENTS

| | | |
|---|---|---|
| 1,141,200 | 12/1962 | Germany. |
| 785,864 | 11/1957 | Great Britain. |
| 810,901 | 3/1959 | Great Britain. |

MILTON BUCHLER, *Primary Examiner.*

EUGENE G. BOTZ, ARTHUR L. LA POINT, FERGUS S. MIDDLETON, *Examiners.*

G. E. A. HALVOSA, *Assistant Examiner.*